Nov. 6, 1923.
A. F. KLEIST
VALVE OPERATING MECHANISM
Filed Aug. 20, 1921
1,473,481
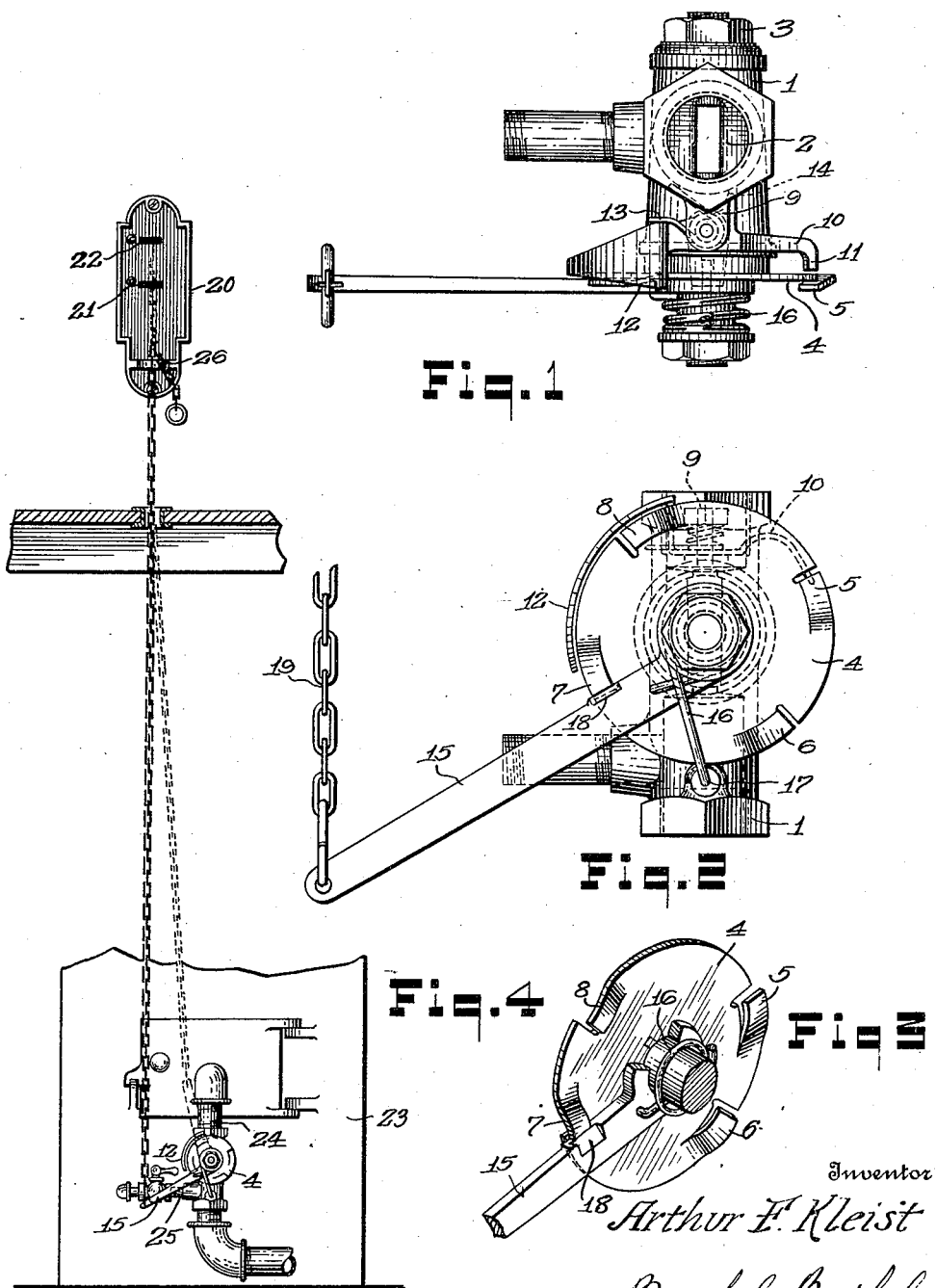

Patented Nov. 6, 1923.

1,473,481

UNITED STATES PATENT OFFICE.

ARTHUR F. KLEIST, OF PONTIAC, MICHIGAN, ASSIGNOR TO CENTRAL STAMPING COMPANY, OF DETROIT, MICHIGAN, A CORPORATION OF MICHIGAN.

VALVE-OPERATING MECHANISM.

Application filed August 20, 1921. Serial No. 493,949.

*To all whom it may concern:*

Be it known that I, ARTHUR F. KLEIST, a citizen of the United States of America, residing at Pontiac, in the county of Oakland and State of Michigan, have invented certain new and useful Improvements in Valve-Operating Mechanism, of which the following is a specification, reference being had therein to the accompanying drawings.

This invention relates to a valve operating mechanism and has for its object to provide a device by means of which the position of the valve may readily be determined from a point at which the valve is invisible.

In the drawing,

Figure 1 is a plan view of the valve with the operating mechanism attached;

Fig. 2 is a front elevation of the valve;

Fig. 3 is a perspective view of the operating disk for the valve with a portion of the lever, and Fig. 4 is a diagrammatic view illustrating the relation of the valve to other elements in one of its applications.

In general the principle of operation of my device is the utilization of a form of ratchet disk in which successive movements of an operating pawl lever will cause a rotation of the ratchet through different angular distances whereby a flexible element connected to the end of the operating lever can be moved a greater or less distance according to the position of the ratchet disk. The operator will thus be able to determine the position of the disk by the point to which the end or other indicating portion of the flexible operating element will reach and since the disk is secured to the valve the operator can readily determine whether the valve is open or closed.

The valve casing 1 is shown as provided with the usual tapered rotating valve 2 which is held in position in the casing by the usual nut 3. Upon the stem of the valve 2 is keyed or otherwise secured against rotation a disk 4. This disk is conveniently made of sheet metal having ratchet lugs 5, 6, 7 and 8 struck up at a slight angle at its periphery. The distance between the lugs 5 and 6 will be the same as the distance between the lugs 7 and 8 and the distance from the lug 6 to the lug 7 will be the same as the distance from the lug 5 to the lug 8, but if the angular distance from the lug 5 to the lug 6 be seventy-five degrees, the distance from the lug 6 to the lug 7 will be one hundred and five degrees, or in other words the lug 5 is diametrically opposite the lug 7 and the lug 6 diametrically opposite the lug 8.

Formed upon the valve casing 1 at one side of the valve 2 is a projecting ear 9 to which is pivoted a lever 10 upon an axis substantially at right angles to that of the valve 2. One end of the lever 10 is hooked as shown at 11 and the other end is formed with a cam edge 12. A spring 13 surrounding the pivot of the lever 10 normally holds the lever substantially parallel with the disk 4. An arm 14 on the lever 10 serves as a stop by its engagement with the body of the valve casing to limit the amount of swing imparted to the lever 10 by the spring 13.

Pivotally mounted upon the stem of the valve 2 is an operating lever 15 which has connected thereto one end of a coiled spring 16 which is preferably formed with two or more coils about the stem and has the end remote from the point of attachment to the lever 15 secured to the valve casing as at 17. The spring 16 because of its coiled form acts to hold the lever 15 in contact with the disk 4 while permitting it to move slightly longitudinally of the stem so that the lever may ride over the bent out lugs as it is moved angularly about the stem by the action of the spring 16.

At the point at which the lever 15 engages the lugs in its motion angularly about the stem a beveled surface 18 is provided so that when the lever is operated by pulling upon the flexible member 19 the beveled edge at 18 will engage beneath one of the lugs and a further pull upon the flexible element will cause the interlocked lever and disk to move angularly about the axis of the valve 2 causing the valve to rotate.

As the lever 15 is moved by a pull upon the flexible element 19 it will come into contact with the curved cam portion 12 of the lever 10, and further movement of the lever 15 will cause the lever 10 to be swung angularly on its pivot so that the hooked end 11 will bear against the surface of the disk 4 opposite the lever 15. As the disk 4 is rotated the hooked end 11 will slide down the sloping surface of the pawl adjacent to the one engaged by the lever and will come into contact with the radial edge of the disk left by the stamping up of the pawl. The engagement of the hook 11 with the stop on the edge of the disk will prevent further angular movement of the lever 15 and consequently further longitudinal movement of the flexible member 19. At the point from which the valve is to be operated a plate 20 may be secured to the wall, the plate conveniently having a lug 26 through which the flexible element 19 may pass and upon the plate 20 indicating marks 21 and 22 may be made to indicate the heights to which a selected portion of the flexible element 19 reaches. After the member 19 has been pulled as far as it will go and released a spring 16 will swing the member 15 angularly in the reverse direction until it has passed the next pawl and if the element 19 is again pulled the beveled portion 15 will engage beneath the next succeeding pawl and cause another partial revolution of the valve 2 until the hook 11 encounters the next stop along the edge of the disk 4. But the angular distance in this second case will be different from that of the former actuation of the disk because of the difference in the location of the pawls around the periphery of the disk and the difference in the angular movement of the lever 15 will be accompanied by a difference in the longitudinal movement of the element 19 so that the indicating point on the flexible element will not reach the same mark as that reached in the previous operation but will reach another mark. The operator will thus be able to determine in which of two possible positions the valve is set so that one of the marks will indicate that the valve is open and the other will indicate that it is closed.

In Fig. 4 the device has been shown as applied to the gas burning furnace 23 the valve being located in the supply pipe 24. A pipe 25 may lead to the usual pilot light not illustrated. It is obvious that the same device may be applied to the gas valve of a water heater or to the valve of a gas meter. Similar valves may be used to control a steam or hot water system, a water supply system, or any other valve controlled conduit.

It is obvious that many changes may be made in the form and proportion of parts without departing from the principle of my invention and I do not therefore wish to be limited to the device as illustrated but wish to claim my invention broadly within a legitimate scope of the appended claims.

What I claim is:—

1. A valve operating mechanism comprising a disk having a plurality of lugs formed upon its periphery at unequal angular distances, an operating lever movable upon the axis of the disk, a spring acting to cause angular movement of the lever in one direction and to hold it in contact with the disk, and a stop mechanism adapted to engage the disk to limit the extent of its angular movement.

2. A structure as in claim 1, in which the stop mechanism is actuated by contact with the operating lever.

3. A valve operating mechanism comprising a disk having four lugs struck up about its periphery at unequal distances, the alternating lugs being diametrically opposite each other, an operating lever movable upon the same axis with the disk, a spring acting to cause angular movement of the lever in one direction and to hold it in contact with the disk, the said lever being formed to engage the lugs to cause rotation of the disk when moved in the direction opposite to that in which it is moved by the spring, and a stop mechanism having a portion thereof interposed in the path of movement of the operating lever to be moved thereby to bring another portion of the stop mechanism into a position in which it will limit the extent of movement of the disk.

4. A valve operating mechanism comprising a movable operating means having a limited movement at each operation, the limit of movement at one operation being different from the limit of movement at the next succeeding operation, a flexible element connected with the operating means and an indicator in connection with the flexible element to show the extent of movement of the operating means.

5. A valve operating mechanism comprising a movable lever, a flexible element attached to the lever to cause movement thereof in one direction, an indicator to show the extent of movement of the flexible element, and means causing a difference in the extent of movement of the lever at different operations.

In testimony whereof I affix my signature in presence of two witnesses.

ARTHUR F. KLEIST.

Witnesses:
  N. W. PETERSON,
  FANNIE IRISH.